Patented Oct. 28, 1930

1,779,820

UNITED STATES PATENT OFFICE

JOSEPH D. McNUTT, OF NEW HAVEN, CONNECTICUT, ASSIGNOR, BY MESNE ASSIGNMENTS, TO WINCHESTER REPEATING ARMS COMPANY, OF NEW HAVEN, CONNECTICUT, A CORPORATION OF DELAWARE

PRIMING MIXTURE

No Drawing. Application filed December 24, 1927. Serial No. 242,523.

My invention relates to an improvement in priming mixtures, the objects being to produce a priming mixture of such a character that it will leave no corrosive residuum.

With these ends in view, my invention consists in a priming mixture characterized by the employment, as its chief oxygen-supplying elements, of a metallic peroxid and a metallic nitrate; as its principal fuel element, a nitrated organic compound; and as its detonating element, a metallic fulminate.

In carrying out my invention, I preferably employ, dependent upon the commercial strength of the ingredients, substantially 30–45% mercury fulminate (dry weight), 20–40% lead peroxid, 3–10% barium nitrate, 3–15% pentaerythritetetranitrate, 15–25% ground glass, though these proportions may be varied as may be necessary to meet the requirements of various uses of the ultimate mixture.

In proceeding to make my improved priming mixture, the lead peroxid, barium nitrate, pentaerythritetetranitrate and ground glass are weighed out, sifted and mixed dry. A small portion of a solution of gum is now added and mixed in. The fulminate in a dampened state is then weighed out and added to the above mixture, and the whole after being thoroughly mixed, is then used in the ordinary manner of such priming mixtures.

I also find that I may use other heavy metal oxids or salts, such as barium dioxid or lead chromate, in place of the lead peroxid or barium nitrate. Also I may substitute trinitroresorcinol, or other suitable nitrated organic substance, in whole or in part, for the pentaerythritetetranitrate. Such substitutions, in whole or in part, fall within the scope of my invention.

I claim:

1. A priming mixture, comprising 20% to 40% of lead peroxid, 3% to 10% barium nitrate, 30% to 45% of mercury fulminate, and 3% to 15% pentaerythritetetranitrate.

2. A priming mixture, comprising 20% to 40% of lead peroxid, 3% to 10% barium nitrate, 30% to 45% of mercury fulminate, 3% to 15% pentaerythritetetranitrate, and 15% to 25% ground glass.

In testimony whereof I affix my signature.

JOSEPH D. McNUTT.